(12) United States Patent  
Haggis et al.

(10) Patent No.: US 8,212,588 B2
(45) Date of Patent: Jul. 3, 2012

(54) OPPORTUNISTIC BUS ACCESS LATENCY (75) Inventors: Theodore P. Haggis, Raleigh, NC (US); Robert B. Likovich, Jr., Raleigh, NC (US); James A. Mossman, Raleigh, NC (US); Tiffany Tamaddoni-Jahromi, Raleigh, NC (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/729,455

(22) Filed: Mar. 23, 2010

(65) Prior Publication Data

US 2011/0234259 A1 Sep. 29, 2011

(51) Int. Cl.
*H03K 19/094* (2006.01)
(52) U.S. Cl. ................. 326/86; 326/30; 326/31; 326/90
(58) Field of Classification Search ........................ None
See application file for complete search history.

(56) References Cited

U.S. PATENT DOCUMENTS

| 5,576,997 A * | 11/1996 | Masuda et al. ........... 365/189.04 |
| 2010/0157700 A1* | 6/2010 | Kong et al. .................... 365/194 |
| 2010/0315891 A1* | 12/2010 | Welker .......................... 365/193 |

* cited by examiner

*Primary Examiner* — Anh Tran
(74) *Attorney, Agent, or Firm* — Cantor Colburn LLP

(57) ABSTRACT

A bus system that includes a plurality of signal driving devices coupled to a common signal bus, a bus controlled circuit coupled to the common signal bus, and a compare circuit. The plurality of signal driving devices include a first signal driving device and a second signal driving device. The bus controller includes delay compensation circuitry with a configurable delay for each of the signal driving devices. The delay compensation circuitry has a current delay chain configuration associated with the first signal driving device. The compare circuit is configured to compare a first configurable delay associated with a first signal driving device to a second configurable delay associated with a second signal driving device of the plurality of signal driving devices, and for generating an output responsive to the comparing that indicates if the current delay chain configuration can be used by the second signal driving device.

20 Claims, 5 Drawing Sheets

OPPORTUNISTIC BUS ACCESS LATENCY

BACKGROUND

The present invention relates generally to computer bus control, and more specifically, to opportunistic bus access latency.

Memory devices and bus signaling frequency has increased to speeds that require special calibration circuits and techniques to compensate for variations in signaling delays to ensure that data transitions arrive at deterministic arrival times. When multiple memory devices are connected together in "ranks" via a common bus to a controller, these techniques may be independently applied to each rank on the bus. A memory rank is a unique, independently addressable area of memory with a predetermined bit-width.

Typically, the calibration circuits are first run at power-up and then periodically to determine and configure a signal delay chain to adjust early signals to match the latest signal arrival. These delay configuration settings can differ widely between different ranks that share a common bus. The controller is configured with a prescribed "rank-to-rank" (R2R) delay, typically 2-4 memory clock cycles, as a worst-case time for rank delay configuration circuits to flush their state and for a new rank delay configuration to be established. Since the R2R delay is fixed for a given design, it results in a memory access latency penalty when access to a given rank is followed by an access to another memory rank, even if the delay configuration between the ranks is inconsequential.

SUMMARY

An exemplary embodiment is a bus system that includes a plurality of signal driving devices coupled to a common signal bus, a bus controlled circuit coupled to the common signal bus, and a compare circuit. The plurality of signal driving devices includes a first signal driving device and a second signal driving device. The bus controller includes delay compensation circuitry with a configurable delay for each of the signal driving devices. The delay compensation circuitry has a current delay chain configuration associated with a configurable delay for the first signal driving device. The compare circuit is configured to compare a first configurable delay associated with a first signal driving device to a second configurable delay associated with a second signal driving device of the plurality of signal driving devices. The compare circuit is also configured for generating output responsive to the comparing that indicates if the current delay chain configuration can be used by the second signal driving device to drive the common signal bus.

Another exemplary embodiment is a method for driving a signal on a bus. The method includes receiving a first configurable delay amount associated with a first signal driving device, and a second configuration delay amount associated with a current delay chain. If the first configurable delay amount is within a threshold of the second configurable delay amount then a signal is driven from the first signal driving device on the bus using the current delay chain configuration. If the first configurable delay amount is not within the threshold of the second configurable delay amount then the current delay chain is modified to correspond to the first configurable delay amount and the signal from the first signal driving device is driven on the bus using the modified delay chain configuration.

A further exemplary embodiment is a computer program product for driving a signal on a bus. The computer program product includes a computer readable storage medium readable by a processing circuit and storing instructions for execution by the processing circuit for implementing a method. The method includes receiving a first configurable delay amount associated with a first signal driving device, and a second configuration delay amount associated with a current delay chain. If the first configurable delay amount is within a threshold of the second configurable delay amount then a signal is driven from the first signal driving device on the bus using the current delay chain configuration. If the first configurable delay amount is not within the threshold of the second configurable delay amount then the current delay chain is modified to correspond to the first configurable delay amount and the signal from the first signal driving device is driven on the bus using the modified delay chain configuration.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments of the present invention provide opportunistic improvements in bus access latency when multiple signal driving devices share a common bus. As used herein, the term "opportunistic" refers to the bus controller in a system determining when the relative timing between any two driving devices is minimal and scheduling consecutive bus requests more closely to reduce the effective access latency of the second request relative to a first request and to increase bus utilization. In typical memory systems, deskew delays are configured for each rank of a memory system to account for varying response times of memory devices in each rank. As used herein, the term "deskew delay" refers to a configurable propagation delay that is used to delay a received signal to align the signal with the latest signal in a group of signals. These delays are implemented by electrical circuit elements, such as, but not limited to: multiplexors, inverters, buffers, delay lines, latches, or phase shifted clocked latches. In an exemplary embodiment, logic circuits compare a deskew delay configuration between a current rank and a next rank for access and indicate to an access controller when the next access can start. When the deskew delay configuration for a next driving device is within a prescribed range of a prior driving device, the deskew delay configuration is partially changed or not changed at all to minimize or eliminate the reconfiguration time for the next driving device. In an exemplary embodiment, a user configurable register prescribes when to use a deskew delay configuration between a plurality of driving devices.

Figure 1:
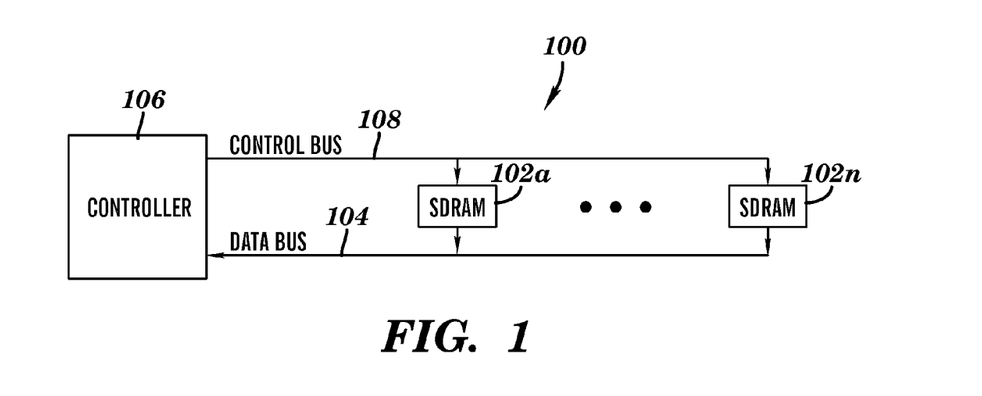
FIG. 1 depicts an example of a communication bus system in accordance with exemplary embodiments.

FIG. 1 depicts an example of a communication bus system 100 in accordance with exemplary embodiments where a common bus is shared by multiple drivers. The system 100 depicted in FIG. 1 depicts an embodiment that may be implemented in a memory system. The system 100 includes a bus controller 106, and a control bus 108 for transmitting information (e.g., addresses, commands) to data signal driving devices 102 (shown here as synchronous dynamic memory access or SDRAM memory devices). The system 100 also includes a high speed data bus 104 for transmitting data from the data signal driving devices 102 to the controller 106. The memory devices depicted in FIG. 1 are examples of high speed signal driving devices 102 that are arranged in ranks (e.g., device 102a is in one rank and device 102n is in another rank). As depicted in FIG. 1, the controller 106 is coupled to a plurality of ranks of memory devices (device 102a to device 102n) via the data bus 104 and the control bus 108.

Other high speed signal driving devices that may be implemented by exemplary embodiments include, but are not limited to: flash memory; phase change memory, microprocessors, and communication devices such as those supporting peripheral component interconnect (PCI) express, infiniband or small computer system interface (SCSI) standards. Thus, exemplary embodiments are not limited to memory systems and may include, but are not limited to: communication systems, processor systems, storage systems, routing, and switching systems.

In an exemplary embodiment, one or more of the data signal driving devices 102, the control bus 108, the data bus 104, and the controller 106 are coupled to each other via one or more of an electrical signal coupling, an electromagnetic signal coupling, and an optical signal coupling.

Figure 2:
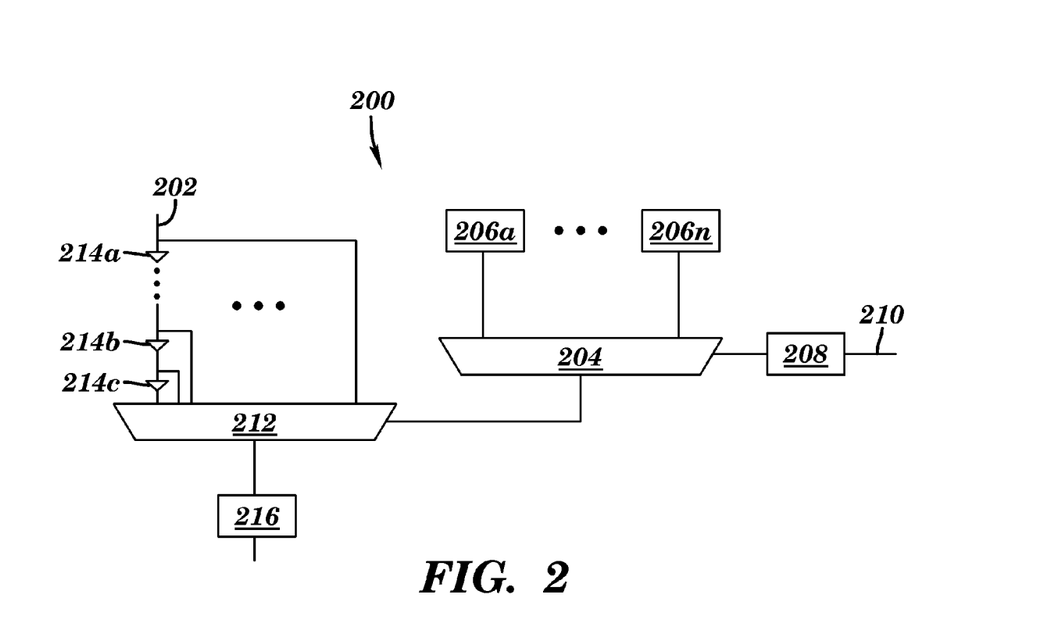
FIG. 2 depicts an example of a logic diagram for a delay compensation circuit.

FIG. 2 depicts an example of a logic diagram for a delay compensation circuit 200 that may be located in the controller 106 for aligning signals on the high speed data bus 104 between each other and with internal signals for reliably capturing information driven by the different ranks of devices 102. As depicted in FIG. 2, a rank associated with a rank access request 210 is stored in a delay compensation control circuit 208. In exemplary embodiments, FIG. 2 also includes delay registers 206 that store delay configurations (also referred to herein as "deskew delays") associated with each rank of devices 102. The rank stored by the compensation control circuit 208 is used by a selector 204 (e.g., a multiplexor) to select the delay register 206 storing an amount of delay that corresponds to the rank. The amount of delay required for the selected rank is output from the rank selector 204 and input to a delay element selector 212 to select a number of delay elements 214 required to implement the amount of delay required by the rank.

Also depicted in FIG. 2, is the input signal 202 received on the data bus 104 from the data signal driving device 102 located at specified rank. Once the input signal has been driven through the delay chain 214, it is stored in a capture register 216. In an exemplary embodiment, the capture register 216 is implemented as a memory and organized as a first in first out (FIFO) queue or circular buffer. As depicted in FIG. 2, delay chains are configured to correspond to the different delay amounts that are required by the different signal driving devices 102.

As used herein, the terms "delay chain configuration" or "deskew delay configuration" are intended to cover any manner of delaying a signal by a specified amount of time, including hardware, software, firmware, or a combination thereof. In addition, the registers described herein may be replaced by any manner of storing information known in the art.

Figure 3:
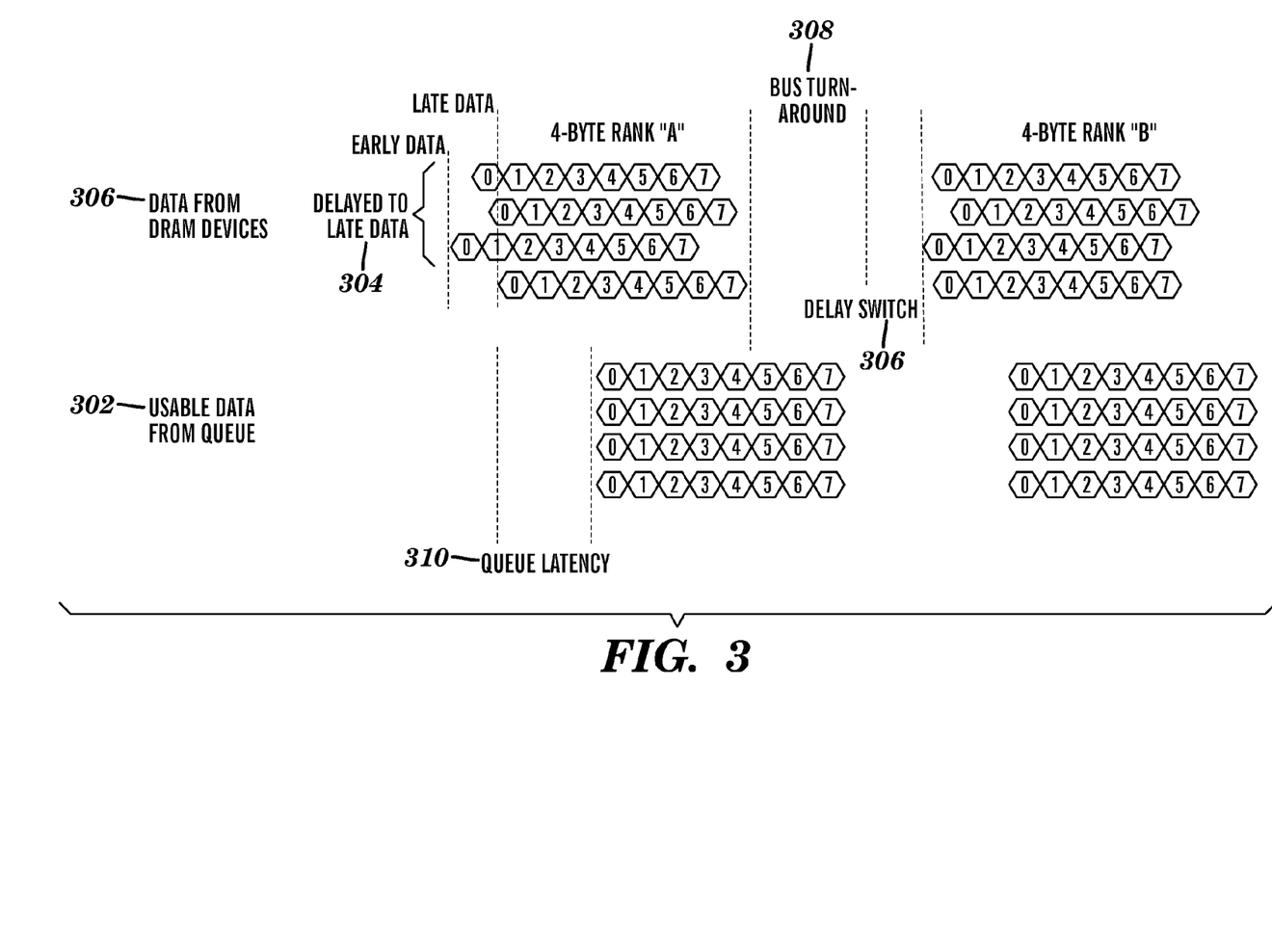
FIG. 3 depicts an example of a timing diagram of memory access delays.

FIG. 3 depicts an example of a timing diagram of example memory access delays. As depicted in FIG. 3 data signals 306 are received from a data signal driving device 102 and aligned to generate usable data 302. In the example depicted in FIG. 3, the data signals 306 are received in four byte ranks (labeled as Rank A and Rank B). As depicted in FIG. 3, the data signals are aligned with the latest arriving data signals. The data signals are then held in the data queue for a period of time referred to as queue latency 310 in order to compensate for the system wide latest arriving rank data and some margin for uncertainty. Once the bits from one rank (in this example Rank A) are captured, a bus turn around (electrical transition period when one driver stops driving and another driver begins driving the bus) period of time 308 is required followed by a delay switch period of time 306 (together referred to herein as R2R delay) to reconfigure the delay chain configuration to support the delay required by the device(s) 102 in Rank B.

Figure 4:
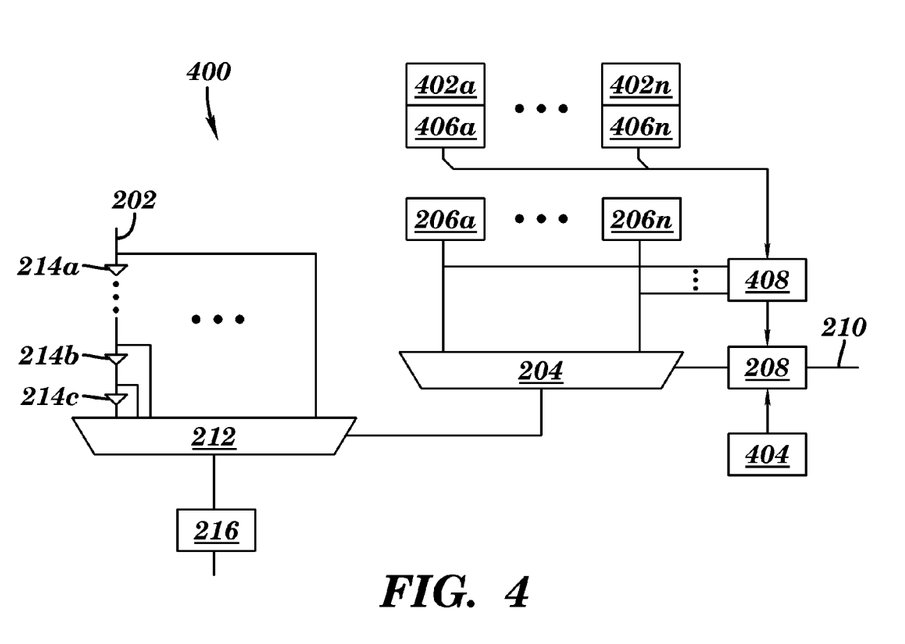
FIG. 4 depicts an example of a logic diagram for a delay compensation circuit in accordance with exemplary embodiments.

FIG. 4 depicts an example of a logic diagram for a delay compensation circuit 400 in accordance with exemplary embodiments. It is similar to the delay compensation circuit 200 depicted in FIG. 2, with the addition of several elements to minimize the R2R delay when possible. FIG. 4 includes a configurable high offset register 402 and a low offset register 406 associated with each of the delay registers 206. As described previously each of the delay registers 206 corresponds to one rank of signal driving devices 102 (e.g., an SDRAM) and stores a configurable delay amount for the devices 102 in the rank. FIG. 4 also includes a logical comparator 408 with output coupled to the delay compensation control circuit 208. The logical comparator 408 is used to compare the configurable delay amount stored in a delay register 206a associated with first signal driving device (e.g., device 102a) to the delay amount stored in another delay register 206n and associated with a second signal driving device (e.g., device 102n). Based on the results of the comparing, an earliest time that the second signal driving device 102 can drive the common signal bus 104 after the first signal driving device 102 has driven the common signal bus 104 is established. This is implemented by modifying the configuration of the delay chain 214 (if required). The comparison can be used to reduce or eliminate the R2R delay when the delay amounts stored in the delay registers 206 are within the thresholds established by the corresponding low offset register 406 and high offset register 402. In an alternate exemplary embodiment, there is only one offset register that stores one or both of a high offset and a low offset.

In an exemplary embodiment, signal driving device 102a has data to drive onto the data bus 104 after data has been driven onto the data bus 104 by signal driving device 102n. In this example, the delay amount stored in delay register 206a is say, 52 delay steps, the high offset value stored in the high offset register 402a is 10 delay steps, and the low offset value stored in the low offset register 406a is 8 delay steps. Also assume that the delay configuration has been set up to implement the amount of delay specified in delay register 206n. If the amount of delay specified in delay register 206n is equal to 64, then the logical comparator 408 (also referred to herein as a "compare circuit") would indicate that the delay configuration has to be modified and thus, the data driving will incur the default R2R delay. If the amount of delay specified in delay register 206n is equal to 60, then the logical comparator 408 would indicate that the current delay configuration can be utilized and that the data can be driven with minimal R2R delay. This example shows that devices associated with input signals 202a and 202n (data signal driving devices 102a and 102n respectively) do not require rank delay switching when they are within 8 steps on the low side and 10 steps on the high side, and in such cases, the controller can schedule adjacent requests closer together on bus 108 for lower latency and higher utilization of bus 104.

Other thresholds schemes may be implemented by exemplary embodiments, for example, to indicate that only a partial modification to the delay chain configuration is required, thus causing only a portion of the R2R delay to be incurred. More sophisticated schemes may be established specifically for system characteristics, such as, but not limited to: temperature, operating voltage, device manufacturer or process, installed device configuration (number, position, type of devices installed), and operating frequency.

In an exemplary embodiment, a user configurable register 404 provides a means for prescribing that a configurable delay 206a associated with a first signal driving device (e.g., device 102a) is always used as the configurable delay for a second signal driving device (e.g., device 102n) as an overriding alternative mode. This overriding mode saves additional cycles by skipping, or bypassing, the comparison step for a consistent R2R delay that is determined through a manual comparison of the rank delays at system initialization.

In an exemplary embodiment, the delay compensation circuit depicted in FIG. 4 is located in the controller 106.

In an exemplary embodiment, alternative delay compensation circuit topologies are utilized, such as, but not limited to, those that employ independent delays chains for each data signal driving device 102.

As used herein, the term "configurable" refers to elements that may be set or updated during system initialization and/or during system runtime based on current operating or environmental conditions.

Figure 5:
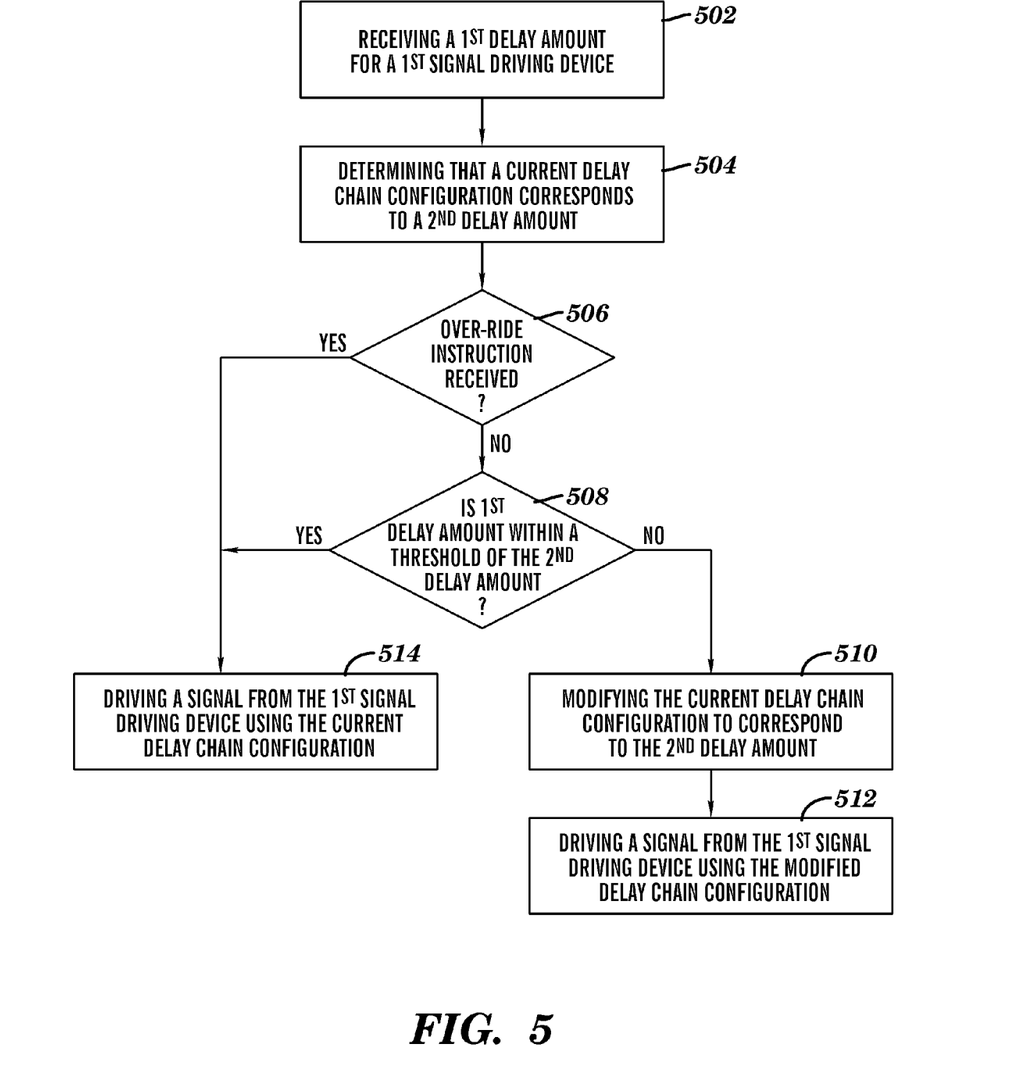
FIG. 5 depicts an exemplary process for opportunistic bus access latency in accordance with exemplary embodiments.

FIG. 5 depicts an exemplary process for opportunistic bus access latency that may be implemented by exemplary embodiments. In an exemplary embodiment, the processing depicted in FIG. 5 is performed by hardware, software, firmware, or a combination thereof located in the bus controller 106, such as delay compensation circuit 400. At block 502, a first configurable delay amount associated with a first signal driving device 102 is received (e.g., by accessing a delay register 206). At block 504, it is determined that a current delay chain configuration corresponds to a second configurable delay amount (e.g., based on the previous device 202 that utilized the shared bus 104). At block 506, it is determined if an override instruction has been received. It the override instruction has been received, then block 514 is performed and a signal is driven from the first signal driving device 102 using the current delay chain configuration. In an exemplary embodiment, the override instruction is received if the user configurable register 404 contains a selected value that indicates an override.

If it is determined, at block 506, that an override instruction was not received, then block 508 is performed to determine if the first delay amount is within a threshold of the second delay amount. In an exemplary embodiment, values in the high offset register 402a and the low offset register 406a are read to determine the threshold. If it is determined that the first delay amount is within a threshold of the second delay amount, then block 514 is performed and a signal is driven from the first signal driving device 102 using the current delay chain configuration. In this manner, the R2R delay is avoided. If it is determined, at block 508, that the first delay amount is not within the threshold of the second delay amount, then block 510 is performed to modify the current delay chain configuration to correspond to the second delay amount. Then block 512 is performed and a signal is driven from the first signal driving device 102 using the modified delay chain configuration.

In an exemplary embodiment, only a subset of the current delay chain is modified at block 510 in response to the amount of delay needed relative to the amount of delay already established is small. The delay circuit can be arranged in a hierarchical structure consisting of coarse and fine delays, where adding or removing a small amount of delay to the existing delay can be performed faster than switching the entire hierarchy, thus saving R2R delay switching time.

In an exemplary embodiment, the entire current delay chain is modified at block 510 in response to the amount of delay needed relative to the amount of delay already established is large. The delay circuit incurs the maximum switching time to establish the new required delay.

Figure 6:
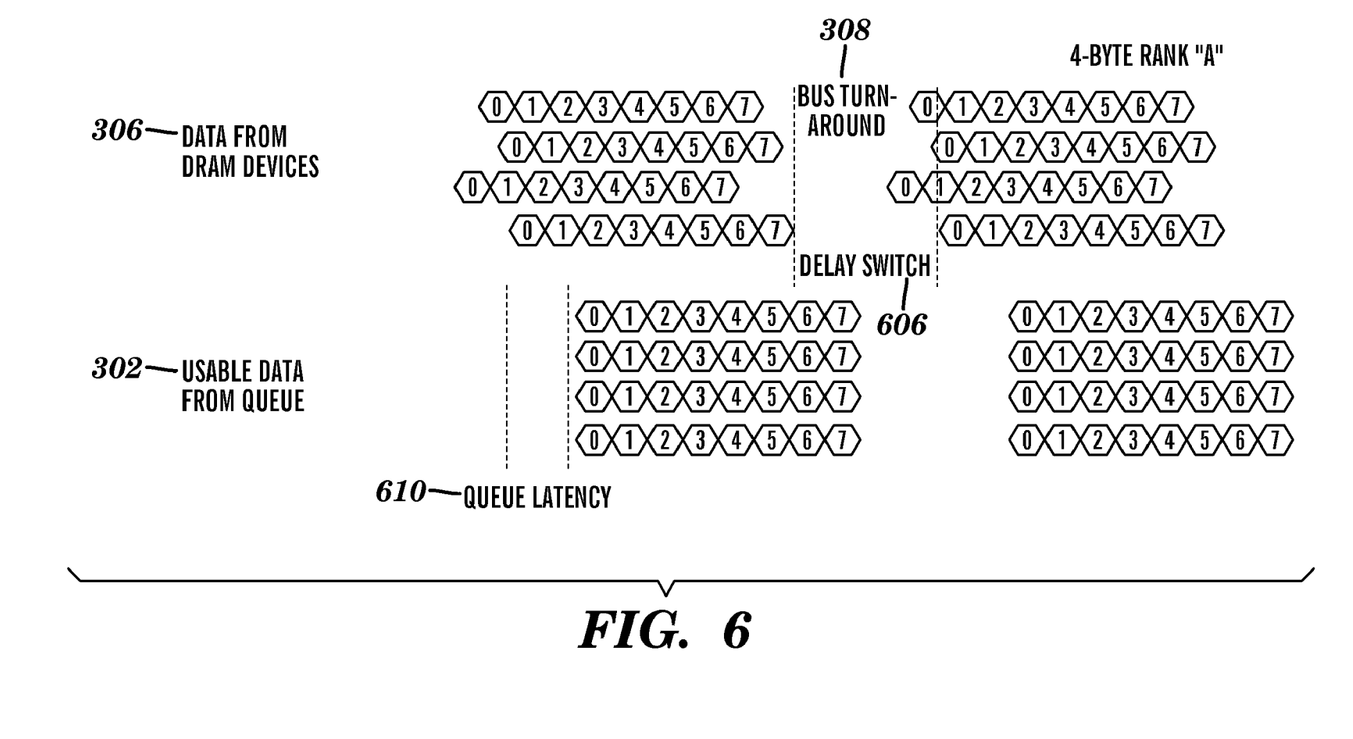
FIG. 6 depicts an example of a timing diagram using a delay compensation circuit in accordance with exemplary embodiments.

FIG. 6 depicts an example of a timing diagram using a delay compensation circuit in accordance with exemplary embodiments. The timing diagram depicted in FIG. 6 is similar to the timing diagram depicted in FIG. 3, however, the timing diagram depicted in FIG. 6 does not include the delay switch period of time 306. As depicted in FIG. 6, the delay switch period of time 306 can be eliminated (or minimized) if the delay required by a next bus access is close (within a threshold of) to the delay implemented for a previous bus access. In addition, the queue latency 610 may be reduced due to the more precise control of when the data will be driven.

Technical effects and benefits include the ability to reduce R2R delay in a bus system where multiple devices share a common bus. This may lead to an increase in bus throughput.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution of the processing described herein. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A bus system, comprising:
    a plurality of signal driving devices coupled to a common signal bus, the plurality of signal driving devices comprising a first signal driving device and a second signal driving device;
    a bus controller device coupled to the common signal bus, the bus controller device comprising delay compensation circuitry with a configurable delay for each of the plurality of signal driving devices, the delay compensation circuitry having a current delay chain configuration associated with a configurable delay for the first signal driving device; and a compare circuit configured to compare the configurable delay associated with the first signal driving device to a configurable delay associated with the second signal driving device, and for generating an output responsive to the comparing that indicates if the current delay chain configuration can be used by the second signal driving device to drive the common signal bus.

2. The bus system of claim 1, further comprising a configurable high offset register, wherein the compare circuit is further configured to adjust the configurable delay associated with the second signal driving device higher in response to contents of the high offset register.

3. The bus system of claim 1, further comprising a configurable low offset register, wherein the compare circuit is further configured to adjust the configurable delay associated with the second signal driving device lower in response to contents of the low offset register.

4. The bus system of claim 1 wherein the bus controller device further comprises a controlling means responsive to the output of the compare circuit for reconfiguring the delay compensation circuitry in response to the output indicating that the current delay chain configuration cannot be used by the second signal driving device to drive the common signal bus.

5. The bus system of claim 1, wherein the bus controller device further comprises a user configurable register prescribing that the current delay chain configuration is always used by the second signal driving device to drive the common signal bus.

6. The bus system of claim 1, wherein the plurality of signal driving devices are memory devices and the common signal bus is a data bus.

7. The bus system of claim 1, wherein the plurality of signal driving devices are communication devices and the common signal bus is a communication system bus.

8. The bus system of claim 1, wherein the signal driving devices are coupled to the common signal bus via one or more of an electrical signal coupling, an electromagnetic signal coupling, and an optical signal coupling, and the bus controller device is coupled to the common signal bus via one or more of an electrical signal coupling, an electromagnetic signal coupling, and an optical signal coupling.

9. A method for driving a signal on a bus, the method comprising:
receiving a first configurable delay amount associated with a first signal driving device;
receiving a second configurable delay amount associated with a current delay chain configuration;
determining if the first configurable delay amount is within a threshold of the second configurable delay amount;
driving a signal from the first signal driving device on the bus using the current delay chain configuration in response to determining that the first configurable delay amount is within the threshold of the second configurable delay amount; and
in response to determining that the first configurable delay amount is not within the threshold of the second configurable delay amount:
modifying the current delay chain configuration to correspond to the first configurable delay amount; and
driving the signal from the first signal driving device on the bus using the modified delay chain configuration.

10. The method of claim 9, wherein the bus is a data bus in a memory system.

11. The method of claim 9, wherein the modifying includes modifying a subset of the current delay chain.

12. The method of claim 9, wherein the modifying includes modifying the entire current delay chain.

13. The method of claim 9, wherein the threshold is specified as a range that includes a high offset value and a low offset value.

14. The method of claim 9, further comprising:
receiving an override instruction; and
in response to receiving the override instruction:
bypassing the determining if the first configurable delay amount is within a threshold of the second configurable delay amount; and
driving the signal from the first signal driving device on the bus using the current delay chain configuration.

15. A computer program product for driving a signal on a bus, the computer program product comprising:
a computer readable storage medium readable by a processing circuit and storing instructions for execution by the processing circuit for implementing a method, the method comprising:
receiving a first configurable delay amount associated with a first signal driving device;
receiving a second configurable delay amount associated with a current delay chain configuration;
determining if the first configurable delay amount is within a threshold of the second configurable delay amount;
driving a signal from the first signal driving device on the bus using the current delay chain configuration in response to determining that the first configurable delay amount is within the threshold of the second configurable delay amount; and
in response to determining that the first configurable delay amount is not within the threshold of the second configurable delay amount:
modifying the current delay chain configuration to correspond to the first configurable delay amount; and
driving the signal from the first signal driving device on the bus using the modified delay chain configuration.

16. The computer program product of claim 15, wherein the bus is a data bus in a memory system.

17. The computer program product of claim 15, wherein the modifying includes modifying a subset of the current delay chain.

18. The computer program product of claim 15, wherein the modifying includes modifying the entire current delay chain.

19. The computer program product of claim 15, wherein the threshold is specified as a range that includes a high offset value and a low offset value.

20. The computer program product of claim 15, wherein the method further comprises:
receiving an override instruction; and
in response to receiving the override instruction:
bypassing the determining if the first configurable delay amount is within a threshold of the second configurable delay amount; and
driving the signal from the first signal driving device on the bus using the current delay chain configuration.

* * * * *